(No Model.)
W. F. CORNELL & W. SMITH.
SAFETY ATTACHMENT TO HARVESTERS.
No. 257,555. Patented May 9, 1882.
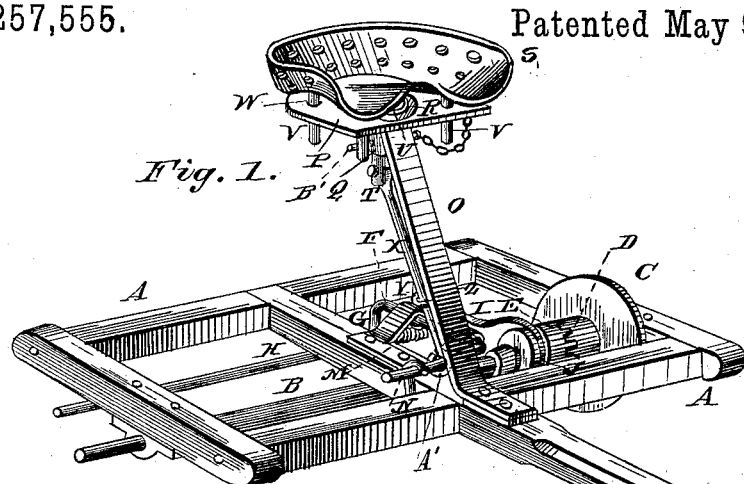
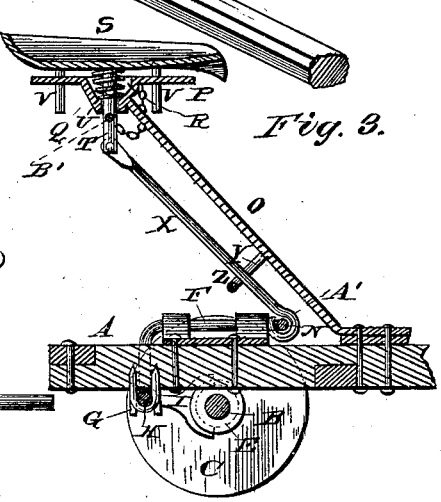
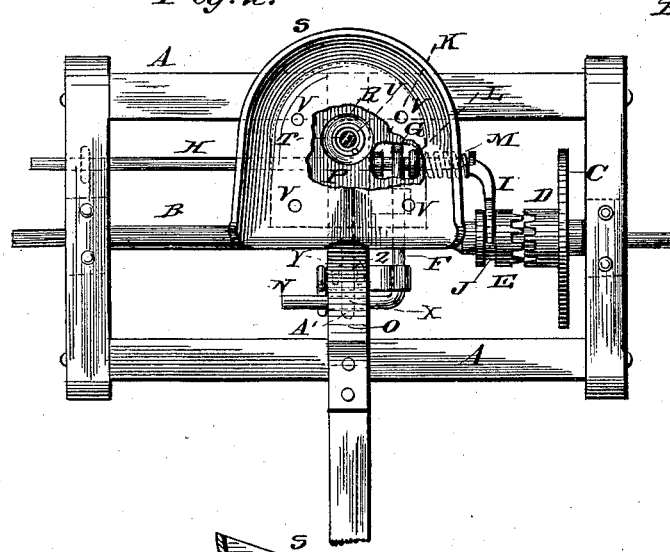
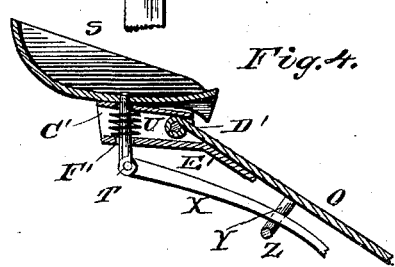
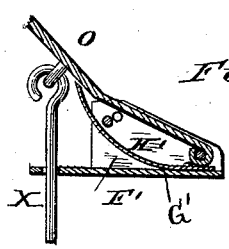
WITNESSES:
INVENTORS.
ATTORNEYS.

UNITED STATES PATENT OFFICE.

WILLIAM F. CORNELL AND WESLEY SMITH, OF ADRIAN, MICHIGAN.

SAFETY ATTACHMENT TO HARVESTERS.

SPECIFICATION forming part of Letters Patent No. 257,555, dated May 9, 1882.

Application filed March 21, 1882. (No model.)

*To all whom it may concern:*

Be it known that we, WILLIAM F. CORNELL and WESLEY SMITH, of Adrian, in the county of Lenawee and State of Michigan, have invented certain new and useful Improvements in Safety Attachments to Harvesters; and we do hereby declare that the following is a full, clear, and exact description of the invention, which will enable others skilled in the art to which it appertains to make and use the same, reference being had to the accompanying drawings, which form a part of this specification.

Figure 1 is perspective view, illustrating our improved safety attachment for harvesters. Fig. 2 is a plan view of the same. Fig. 3 is a vertical sectional view; and Figs. 4 and 5 are vertical sectional views, illustrating modifications of our invention.

Corresponding parts in the several figures are denoted by like letters of reference.

This invention relates to an improved safety attachment for harvesters, having for its object to throw the operating mechanism instantaneously and automatically out of gear in case the driver should be thrown, or whenever he leaves his seat; and it consists in the construction and arrangement of parts, which will be hereinafter fully described, and particularly pointed out in the claims.

In the drawings hereto annexed, A may represent the harvester-frame; B, the axle; and C, the driving-wheel, mounted loosely upon the axle, and provided with a clutch-collar, D.

E is a part of the clutch sliding longitudinally upon the axle, with which it is connected, so as to turn therewith.

F is a rock-shaft, mounted longitudinally in suitable bearings in the frame, and having at its rear end a forked arm, G, straddling a transverse rod, H, which is mounted to slide in suitable bearings in the rear of the axle. Rod H is provided at one end with a forked arm, I, fitting in an annular groove, J, in the clutch E. Rod H is also provided with an annular flange, K, and a loose washer, L, between which latter and the arm I a coiled spring, M, is interposed, forcing the said washer in the direction of the flange K, between which and washer L the forked arm G of the rock-shaft F is thus confined. The rock-shaft F is provided at its front end with an arm or crank, N, which, when forced in a downward direction, turns the rock-shaft, causing the arm G at its rear end to bear against the washer L, thus compressing the spring M against arm I of rod H, which is thereby forced in an outward direction, the arm I sliding the clutch E on the axle in the direction of clutch-collar D upon the driving-wheel, with which it meshes, thus throwing the operating mechanism which drives the cutter-bar, &c., into gear. When the pressure upon arm N of the rock-shaft is released and said arm is raised the forked arm G of the rock-shaft is caused to press against the flange K of the sliding rod H, which is thus moved in an opposite direction, disengaging the clutch E from the driving-wheel and throwing the operating mechanism out of gear.

O is the seat-bar, which is suitably mounted upon the frame, and provided at its upper end with a horizontal plate, P, having a socket, Q, provided with a central opening, R.

S is the driver's seat, which has a central downward-projecting stud, T, passing through the opening R. A strong coiled spring, U, placed in the socket Q, encircles the stud T and forces the driver's seat in an upward direction. The seat S is provided with several guide-studs, V, passing through perforations W in the plate P.

To the lower end of the stud T is hinged a rod, X, passing through a guide-slot, Y, in a bracket, Z, upon the under side of the seat-bar. The lower end of the rod X has an eye, A', encircling the arm N of the rock-shaft F, which is thereby operated.

When the driver takes his seat the latter is forced down against the tension of the spring, and the rod X forces the arm N of rock-shaft F in a downward direction, thus throwing the machine into gear. Should the driver fall or be thrown off his seat, or leave it for any cause, it is instantly forced upward by the spring U, thus, through the intermediate mechanism, throwing the machine out of gear, so that there is no danger of his being seriously hurt or mutilated by the knives or cutters or other working parts of the machine.

When desired, the seat may be retained in either raised or lowered position, and the machine consequently in or out of gear, by a pin, B', passing through the socket Q, and the stud T, which, for this purpose, are provided with suitable perforations.

In Fig. 4 of the drawings is shown a modification, which consists in providing the seat S, upon its under side, with flanges C' C', and connecting it by means of a hinge, D', to the seat-bar, which is provided with a bracket, E', which has a perforation, F', to admit the stud T upon the under side of the seat. The spring U, which is coiled around stud T, is interposed between the bracket E' and the seat, which is thereby forced in an upward direction. In Fig. 5 the seat-bar is hinged between flanges F' F' to a plate, G', between which and said seat-bar a strong flat spring, H', is interposed, thus forcing said seat-bar and the seat upward. The connecting-rod X is in this case hinged or suitably connected direct to the seat-bar.

The operation and advantages of our invention will be readily understood from the foregoing description and by reference to the drawings hereto annexed. It is simple, inexpensive, easily applied to harvesters now in use, and is a complete safeguard to the driver in case he should fall from his seat. He is also enabled to control with perfect ease the operating mechanism of the machine by simply rising in his seat when he desires to throw the machine out of gear.

Having thus described our invention, we claim and desire to secure by Letters Patent of the United States—

1. The combination of the rock-shaft F, having forked arm G, the sliding rod H, having forked arm I, flange K, and washer L, the spring M, interposed between said arm and washer, and mechanism for manipulating the rock-shaft by the raising and lowering of the driver's seat, as set forth.

2. The combination of the seat-bar O, having plate P provided with socket Q and opening R, the seat S, having stud T, the coiled spring U, placed in socket Q, encircling the stud T, the pin B', adjustable in transverse perforations in the socket and stud, the connecting-rod X, rock-shaft F, and mechanism operated by said rock-shaft for throwing the machine into or out of gear, as set forth.

In testimony that we claim the foregoing as our own we have hereto affixed our signatures in presence of two witnesses.

WM. F. CORNELL.
WESLEY SMITH.

Witnesses:
JOHN G. BOTSFORD,
J. REED LITTELL.